(12) United States Patent
Asano et al.

(10) Patent No.: US 11,485,646 B2
(45) Date of Patent: Nov. 1, 2022

(54) SOLID ELECTROLYTE MATERIAL AND BATTERY

(71) Applicant: Panasonic Intellectual Property Management Co., Ltd., Osaka (JP)

(72) Inventors: Tetsuya Asano, Nara (JP); Akihiro Sakai, Nara (JP); Masashi Sakaida, Hyogo (JP); Yusuke Nishio, Osaka (JP); Akinobu Miyazaki, Osaka (JP); Shinya Hasegawa, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 344 days.

(21) Appl. No.: 16/911,596

(22) Filed: Jun. 25, 2020

(65) Prior Publication Data

US 2020/0328456 A1    Oct. 15, 2020

Related U.S. Application Data

(63) Continuation of application No. PCT/JP2018/046256, filed on Dec. 17, 2018.

(30) Foreign Application Priority Data

Jan. 5, 2018    (JP) .............................. JP2018-000421

(51) Int. Cl.
*H01M 10/0525*  (2010.01)
*H01M 10/0562*  (2010.01)
(Continued)

(52) U.S. Cl.
CPC ......... *C01F 17/36* (2020.01); *H01M 10/0525* (2013.01); *H01M 10/0562* (2013.01);
(Continued)

(58) Field of Classification Search
CPC ......... H01M 10/0525; H01M 10/0562; H01M 2004/027; H01M 2004/028; H01M 2300/008
See application file for complete search history.

(56) References Cited

U.S. PATENT DOCUMENTS

2012/0301796 A1    11/2012  Ohtomo et al.
2016/0103232 A1*    4/2016  Ouspenski ......... C09K 11/7773
                                                                 117/78
(Continued)

FOREIGN PATENT DOCUMENTS

CN        108701860 A    10/2018
EP         3496202 A1     6/2019
(Continued)

OTHER PUBLICATIONS

Asano et al., Solid Halide Electrolytes with High Lithium-Ion Conductivity for Application in 4 V Class Bulk-Type All-Solid-State Batteries, Advanced Materials, Communication, All-Solid State Batteries, pp. 1-8 (Year: 2018).*

(Continued)

*Primary Examiner* — Jayne L Mershon
(74) *Attorney, Agent, or Firm* — McDermott Will & Emery LLP

(57) ABSTRACT

A solid electrolyte material includes a first crystal phase. The first crystal phase has a composition that is deficient in Li as compared with a composition represented by the following composition formula (1).

$$Li_3Y_1Cl_6 \qquad \text{formula (1)}$$

12 Claims, 7 Drawing Sheets

(51) Int. Cl.
    *C01F 17/36*     (2020.01)
    *H01M 4/02*     (2006.01)

(52) U.S. Cl.
    CPC ............ *H01M 2004/027* (2013.01); *H01M 2004/028* (2013.01); *H01M 2300/008* (2013.01)

(56) References Cited

U.S. PATENT DOCUMENTS

2017/0139059 A1    5/2017    Ouspenski et al.
2019/0088995 A1    3/2019    Asano et al.

FOREIGN PATENT DOCUMENTS

JP    2006-244734    9/2006
JP    2011-129312    6/2011

OTHER PUBLICATIONS

Umeshbabu et al. (Influence of Chloride Ion Substitution on Lithium-Ion Conductivity and Electrochemical Stability in a Dual-Halogen Solid-State Electrolyte), Applied Materials and Interfaces, vol./Issue 14, pp. 25448-25456 (Year: 2022).*
English Translation of Chinese Search Report dated Jul. 27, 2021 for the related Chinese Patent Application No. 201880071191.7.
International Search Report of PCT application No. PCT/JP2018/046256 dated Feb. 5, 2019.
Andreas Bohnsack et al., "Ternary Chlorides of the Rare-Earth Elements with Lithium, Li3MCl6 (M=Tb—Lu, Y, Sc): Synthesis, Crystal Structures, and Ionic Motion", Journal of Inorganic and General Chemistry, Jul. 1997, vol. 623/Issue 7, pp. 1067-1073.
The Extended European Search Report dated Feb. 4, 2021 for the related European Patent Application No. 18898263.1.

* cited by examiner

SOLID ELECTROLYTE MATERIAL AND BATTERY

BACKGROUND

1. Technical Field

The present disclosure relates to a solid electrolyte material and a battery.

2. Description of the Related Art

Japanese Unexamined Patent Application Publication No. 2011-129312 discloses an all-solid-state battery containing a sulfide solid electrolyte.

Japanese Unexamined Patent Application Publication No. 2006-244734 discloses an all-solid-state battery that includes an indium-containing halide as a solid electrolyte.

Z. anorg. allg. Chem. 623 (1997) 1067 discloses $Li_3YCl_6$.

SUMMARY

In one general aspect, the techniques disclosed here feature a solid electrolyte material that includes a first crystal phase. The first crystal phase has a composition that is deficient in Li as compared with a composition represented by the following composition formula (1).

$$Li_3Y_1Cl_6 \qquad \text{formula (1)}$$

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
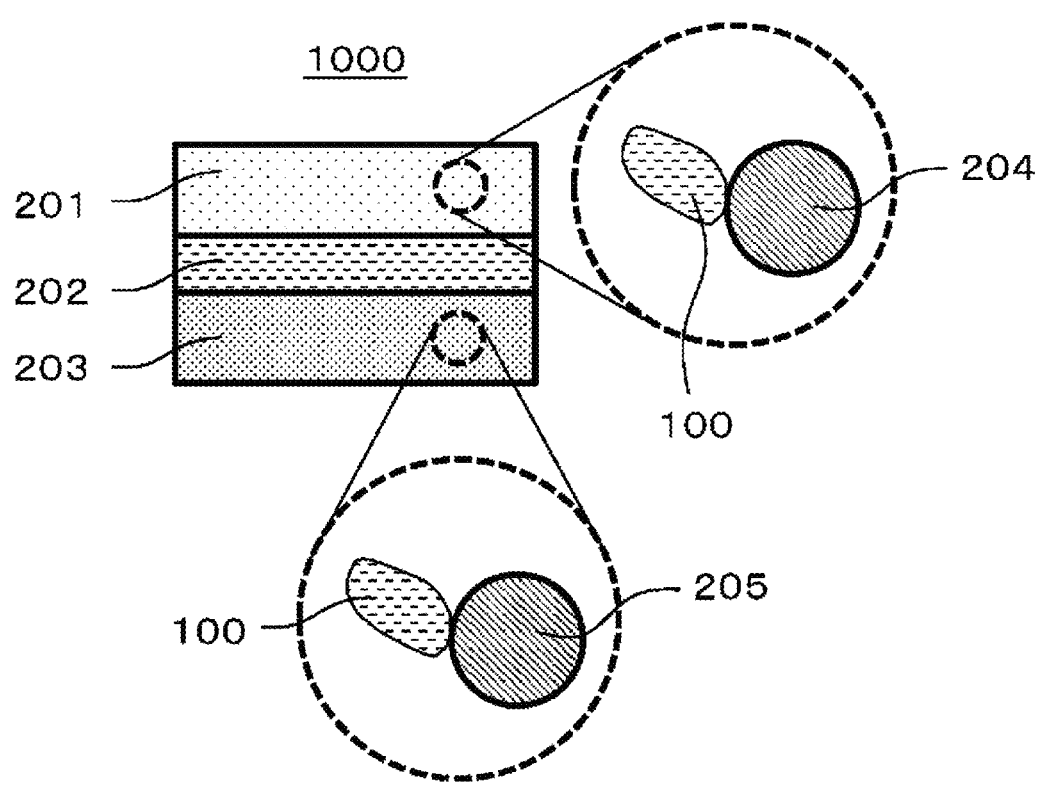
FIG. 1 is a schematic cross-sectional view of a battery according to a second embodiment.

Embodiments of the present disclosure are described below with reference to the accompanying drawings.

First Embodiment

A solid electrolyte material according to a first embodiment is a solid electrolyte material including a first crystal phase.

The first crystal phase has a composition that is deficient in Li as compared with a composition represented by the following composition formula (1). The first crystal phase may have a composition including a Li deficiency in the following composition formula (1).

$$Li_3Y_1Cl_6 \qquad \text{formula (1)}$$

A solid electrolyte material (for example, a halide solid electrolyte material) with such a structure can have high lithium ion conductivity. Such a solid electrolyte material can have a stable structure in the expected operating temperature range of the battery (for example, −30° C. to 80° C.). The solid electrolyte material according to the first embodiment does not have a structure in which the phase transition temperature is in the operating temperature range of the battery (for example, a structure described in Japanese Unexamined Patent Application Publication No. 2006-244734). Thus, the solid electrolyte material according to the first embodiment can stably maintain high ionic conductivity without causing a phase transition in the operating temperature range of the battery even in a temperature changing environment.

With such a structure, the solid electrolyte material according to the first embodiment can be used to provide an all-solid-state secondary battery with good charge-discharge characteristics. The solid electrolyte material according to the first embodiment can also be used to provide a sulfur-free all-solid-state secondary battery. The solid electrolyte material according to the first embodiment does not have a structure that generates hydrogen sulfide when exposed to the atmosphere (for example, a structure described in Japanese Unexamined Patent Application Publication No. 2011-129312). An all-solid-state secondary battery thus produced generates no hydrogen sulfide and has improved safety.

In the solid electrolyte material according to the first embodiment, the first crystal phase may be represented by the following composition formula (2).

$$Li_{3-3\delta}Y_{1+\delta}Cl_6 \qquad \text{formula (2)}$$

$$0 \leq \delta \leq 0.15$$

A solid electrolyte material with such a structure can have higher lithium ion conductivity.

In the solid electrolyte material according to the first embodiment, the composition formula (2) may satisfy $0.01 \leq \delta \leq 0.133$.

A solid electrolyte material with such a structure can have higher lithium ion conductivity.

In the solid electrolyte material according to the first embodiment, the solid electrolyte material may have an X-ray diffraction pattern that includes a peak in each of a first range, a second range, and a third range, the X-ray diffraction pattern being measured using Cu-Kα radiation as an X-ray source. In the first range, a diffraction angle 2θ is 30.34 degrees or more and 32.36 degrees or less. In the second range, the diffraction angle 2θ is 39.51 degrees or more and 42.07 degrees or less. In the third range, the diffraction angle 2θ is 47.18 degrees or more and 50.30 degrees or less.

A solid electrolyte material with such a structure can have higher lithium ion conductivity.

In the solid electrolyte material according to the first embodiment, the X-ray diffraction pattern further may include a peak in a fourth range in which the diffraction angle 2θ is 15.2 degrees or more and 16.23 degrees or less and include a peak in a fifth range in which the diffraction angle 2θ is 52.4 degrees or more and 54.6 degrees or less.

A solid electrolyte material with such a structure can have higher lithium ion conductivity.

To obtain an X-ray diffraction pattern, X-ray diffraction may be measured by a θ-2θ method using Cu-Kα radiation (wavelengths of 1.5405 and 1.5444 angstroms) as X-rays. When the measured intensity is insufficient, part of the above peaks may not be observed. An X-ray source other than Cu-Kα radiation may also be used. In such a case, it goes without saying that the above diffraction angles 2θ can be converted by the Bragg equation (2d sin(θ)=λ, d: interplanar spacing, θ: diffraction angle, λ: the wavelength of X-rays).

The first crystal phase in which a peak is observed in the above 2θ range is not limited to a particular crystal structure and may have the following crystal structure, for example.

One of such crystal structures is a $Li_3YbCl_6$ (hereinafter also referred to as LYC) structure with a crystal structure belonging to the space group Pnma, wherein the lattice constants of the unit cell are a=12.67 to 13.19 angstroms, b=10.98 to 11.44 angstroms, c=5.91 to 6.16 angstroms, α=90 degrees, β=90 degrees, and γ=90 degrees.

Another crystal structure may be a $Li_3ErCl_6$ structure with a crystal structure belonging to the space group P-3m1, wherein the lattice constants of the unit cell are a=10.97 to 11.5 angstroms, b=a, c=5.9 to 6.2 angstroms, α=90 degrees, β=90 degrees, and γ=120 degrees.

In particular, the crystal structure may have almost the same arrangement of chlorine as in the $Li_3YbCl_6$ or $Li_3ErCl_6$ structure, that is, may have a chlorine sublattice with an atomic arrangement of a distorted hexagonal close-packed structure.

In other words, the first crystal phase may contain a chlorine sublattice, and the arrangement of chlorine in the sublattice may contain an atomic arrangement of a distorted hexagonal close-packed structure.

A solid electrolyte material with such a structure can have higher lithium ion conductivity.

The first crystal phase may contain the atomic arrangement of the $Li_3YbCl_6$ structure.

A solid electrolyte material with such a structure can have higher lithium ion conductivity.

Figure 2A:
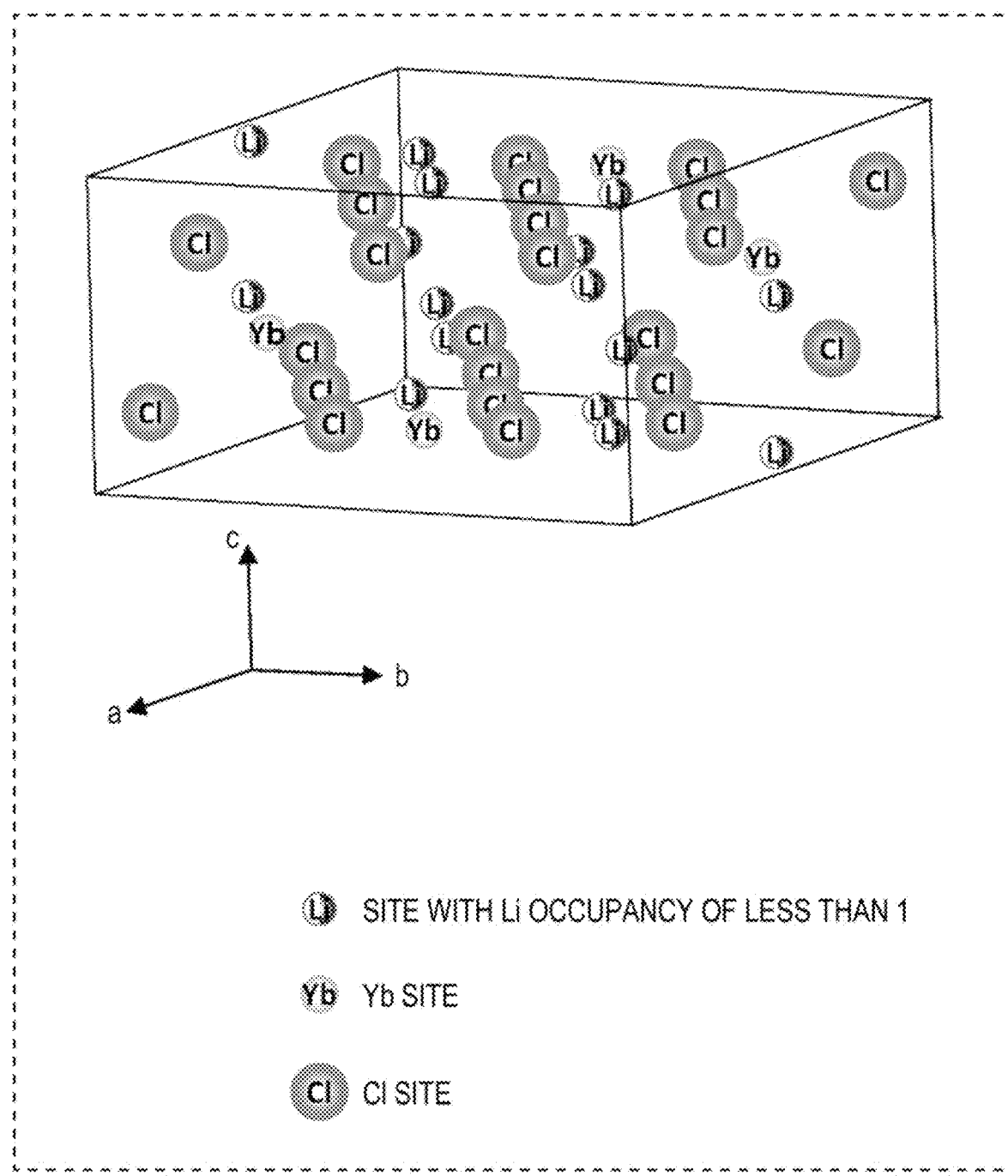
FIG. 2A is a view of the crystal structure of a $Li_3YbCl_6$ structure.
Figure 2B:
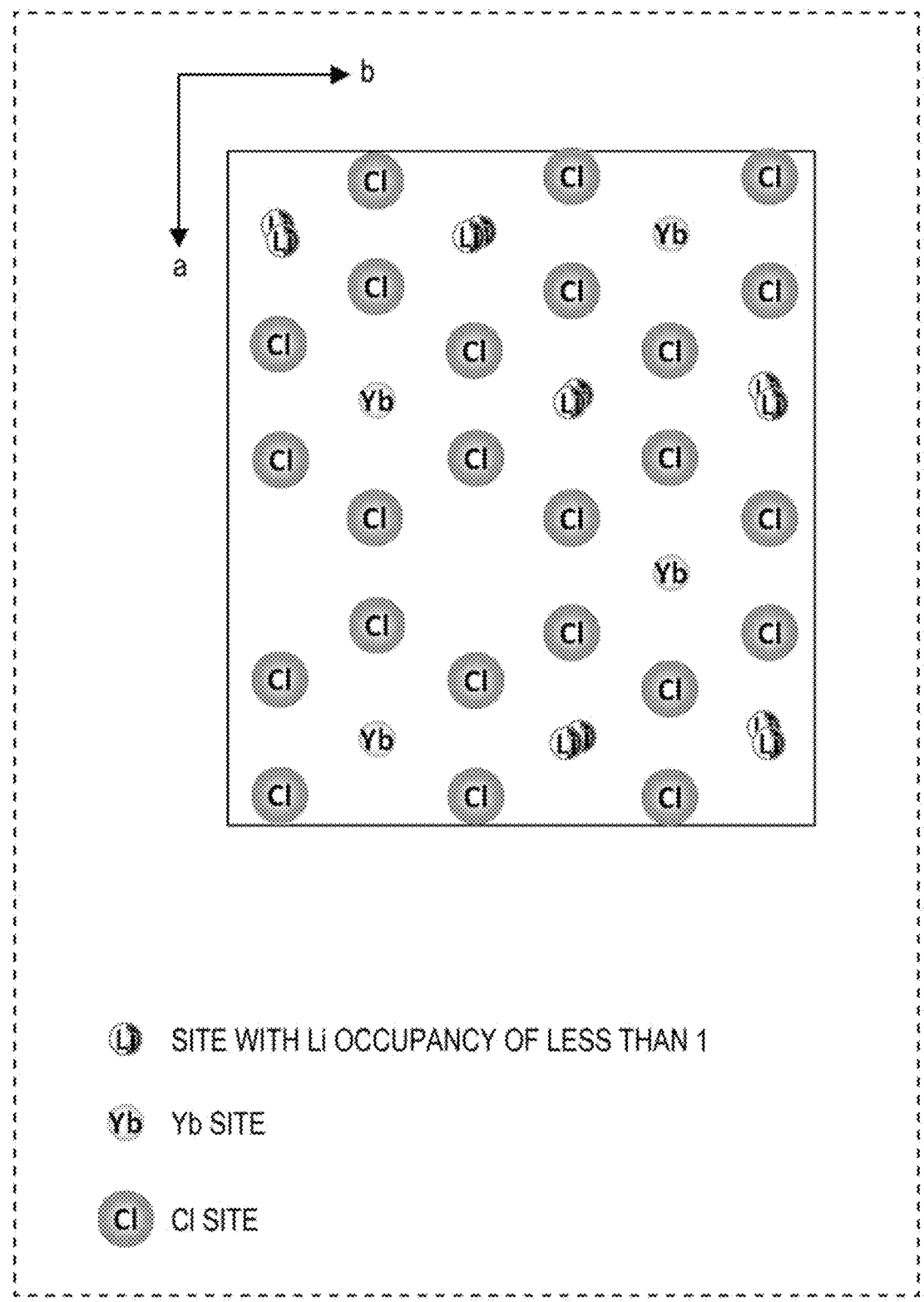
FIG. 2B is a view of the crystal structure of a $Li_3YbCl_6$ structure.

FIGS. 2A and 2B illustrate the crystal structure of the $Li_3YbCl_6$ structure.

FIG. 2A is a perspective view of the crystal structure of the $Li_3YbCl_6$ structure.

FIG. 2B is a top view of the crystal structure of the $Li_3YbCl_6$ structure projected in the c-axis direction.

As illustrated in FIGS. 2A and 2B, the $Li_3YbCl_6$ structure (LYC structure) has the symmetry of the orthorhombic crystal system and belongs to the space group Pnma. In the characteristic $Li_3YbCl_6$ structure, the chlorine sublattice has an atomic arrangement of a distorted hexagonal close-packed structure. More specifically, in the abc axes defined in FIG. 2, six chlorine atoms in almost the same ab planes have an interatomic distance in the range of 3.6 to 3.9 angstroms and a bond angle of 60±5 degrees. The chlorine atoms in the ab planes are alternately located at almost the same atomic positions in the c-axis direction. The detailed atomic arrangement is described in the inorganic crystal structure database (ICSD).

A solid electrolyte material with such a structure can have higher lithium ion conductivity. More specifically, in a crystal structure like the first crystal phase, Cl is more strongly attracted to the vicinity of Y. This forms a lithium ion diffusion path. Furthermore, an unoccupied site is formed in the Li-deficient composition and facilitates lithium ion conduction. Thus, it is surmised that lithium ion conductivity is further improved.

The X-ray diffraction pattern of the solid electrolyte material according to the first embodiment may satisfy $FWHM/2θ_p ≤ 0.01$, where FWHM denotes a full width at half maximum of the peak in the first range, and $2θ_p$ denotes a central value of the peak.

A solid electrolyte material with such a structure can have higher lithium ion conductivity.

The FWHM is the full width at half maximum of an X-ray diffraction peak at the above 2θ=30.34 to 32.36 degrees measured by the X-ray diffractometry.

The $2θ_p$ is the diffraction angle at the center of the X-ray diffraction peak (peak central value).

In the solid electrolyte material according to the first embodiment, the first crystal phase may have a distorted structure, and the atoms may be located at slightly different positions.

The solid electrolyte material according to the first embodiment may have a different crystal phase with a different crystal structure from the first crystal phase.

The different crystal phase may be located between the first crystal phases.

The different crystal phase may include a second crystal phase with a LiCl parent structure.

A solid electrolyte material with such a structure can have higher lithium ion conductivity.

The second crystal phase may have an X-ray diffraction pattern that includes a peak in at least one range selected from the group consisting of a range in which a diffraction angle 2θ is 29.18 degrees or more and 31.03 degrees or less and a range in which the diffraction angle 2θ is 33.83 degrees or more and 36.00 degrees or less, the X-ray diffraction pattern being measured by the θ-2θ method using Cu-Kα radiation (wavelengths of 1.5405 and 1.5444 angstroms) as an X-ray source. The second crystal phase may have an X-ray diffraction pattern that includes a peak at a diffraction angle 2θ in the range of 29.18 to 31.03 degrees and a peak at a diffraction angle 2θ in the range of 33.83 to 36.00 degrees.

A solid electrolyte material with such a structure can have higher lithium ion conductivity.

The second crystal phase having a peak in the above 2θ range may have a rock-salt structure belonging to the space group Fm-3m, wherein the lattice constants of the unit cell are a=b=c=5.13 angstroms and α=β=γ=90 degrees.

The different crystal phase may include a third crystal phase with a $YCl_3$ parent structure.

A solid electrolyte material with such a structure can have higher lithium ion conductivity.

The third crystal phase may have an X-ray diffraction pattern that includes a peak in at least one range selected from the group consisting of a range in which a diffraction angle 2θ is 14.34 degrees or more and 15.23 degrees or less and a range in which the diffraction angle 2θ is 25.65 degrees or more and 27.26 degrees or less, the X-ray diffraction pattern being measured by the θ-2θ method using Cu-Kα radiation (wavelengths of 1.5405 and 1.5444 angstroms) as an X-ray source. The third crystal phase may have an X-ray diffraction pattern that includes a peak at a diffraction angle 2θ in the range of 14.34 to 15.23 degrees and a peak at a diffraction angle 2θ in the range of 25.65 to 27.26 degrees.

A solid electrolyte material with such a structure can have higher lithium ion conductivity.

The third crystal phase having a peak in the above 2θ range may have a structure belonging to the space group C2/m, wherein the lattice constants of the unit cell are a=6.92 angstroms, b=11.94 angstroms, c=6.44 angstroms, β=90 degrees, β=111 degrees, and γ=90 degrees.

The different crystal phase is not limited to the second crystal phase or the third crystal phase and may be another crystal phase.

The solid electrolyte material according to the first embodiment may have an amorphous phase.

The solid electrolyte material according to the first embodiment may have any shape, for example, acicular, spherical, or ellipsoidal. For example, the solid electrolyte material according to the first embodiment may be particles. Particles may be stacked and then pressed to form pellets or a sheet.

For example, a particulate (for example, spherical) solid electrolyte material according to the first embodiment may have a median size in the range of 0.1 to 100 μm.

In the first embodiment, the median size may range from 0.5 to 10 μm.

Such a structure can further increase ionic conductivity. Furthermore, the solid electrolyte material according to the first embodiment and an active material can be more satisfactorily dispersed.

In the first embodiment, the solid electrolyte material may be smaller than the median size of the active material.

Such a structure enables the solid electrolyte material according to the first embodiment and the active material to be more satisfactorily dispersed.

The phrase "a specified value A ranges from B to C", as used herein, refers to "a range of B≤A≤C".

<Method for Producing Solid Electrolyte Material>

The solid electrolyte material according to the first embodiment can be produced by the following method, for example.

Raw powders of a binary halide are prepared at a blend ratio of the desired composition. For example, to prepare $Li_3YCl_6$, LiCl and $YCl_3$ are prepared at a mole ratio of approximately 3:1. In consideration of a variation in composition in the synthesis process, the blend ratio may be adjusted in advance to offset the variation.

The mixing ratio of the raw powders can be altered to adjust the ratio of a Li (lithium) deficient crystal phase in the composition formula (1). For example, "S" in the composition formula (2) can be altered.

The raw powders are blended well and are then mixed, ground, and reacted by a mechanochemical milling method. It may be followed by firing in a vacuum or in an inert atmosphere. Alternatively, the raw powders may be blended well and fired in a vacuum or in an inert atmosphere. The firing conditions may be 100° C. to 650° C. for 1 hour or more.

Thus, a solid electrolyte material including a crystal phase as described above is produced.

The raw material ratio and the reaction method and the reaction conditions of the raw powders can be adjusted for the crystal phase structure and crystal structure in the solid electrolyte material and the peak position in an X-ray diffraction pattern measured using Cu-Kα as a radiation source.

Second Embodiment

The second embodiment is described below. The contents described in the first embodiment may be appropriately omitted to avoid overlap.

A battery according to the second embodiment contains the solid electrolyte material described in the first embodiment.

The battery according to the second embodiment includes the solid electrolyte material, a positive electrode, a negative electrode, and an electrolyte layer.

The electrolyte layer is located between the positive electrode and the negative electrode.

At least one of the positive electrode, the electrolyte layer, and the negative electrode contains the solid electrolyte material according to the first embodiment.

Such a structure can improve the charge-discharge characteristics of the battery.

A specific example of the battery according to the second embodiment is described below.

FIG. 1 is a schematic cross-sectional view of a battery 1000 according to the second embodiment.

The battery 1000 according to the second embodiment includes a positive electrode 201, a negative electrode 203, and an electrolyte layer 202.

The positive electrode 201 contains positive-electrode active material particles 204 and solid electrolyte particles 100.

The electrolyte layer 202 is located between the positive electrode 201 and the negative electrode 203.

The electrolyte layer 202 contains an electrolyte material (for example, a solid electrolyte material).

The negative electrode 203 contains negative-electrode active material particles 205 and the solid electrolyte particles 100.

The solid electrolyte particles 100 are particles of the solid electrolyte material according to the first embodiment or particles composed mainly of the solid electrolyte material according to the first embodiment.

The positive electrode 201 contains a material that can adsorb and desorb metal ions (for example, lithium ions). The positive electrode 201 contains a positive-electrode active material (for example, the positive-electrode active material particles 204), for example.

Examples of the positive-electrode active material include lithium-containing transition metal oxides (for example, $Li(NiCoAl)O_2$, $LiCoO_2$, etc.), transition metal fluorides, polyanion and fluorinated polyanion materials, transition metal sulfides, transition metal oxyfluorides, transition metal oxysulfides, and transition metal oxynitrides.

The positive-electrode active material particles 204 may have a median size in the range of 0.1 to 100 μm. The positive-electrode active material particles 204 with a median size of less than 0.1 μm in the positive electrode, together with a halide solid electrolyte material, may not achieve a satisfactory dispersion state.

This results in the battery with poor charge-discharge characteristics. The positive-electrode active material particles 204 with a median size of more than 100 μm results in slow lithium diffusion in the positive-electrode active material particles 204. This may make the high-power operation of the battery difficult.

The positive-electrode active material particles 204 may have a larger median size than the halide solid electrolyte material. In such a case, the positive-electrode active material particles 204 and the halide solid electrolyte material can achieve a satisfactory dispersion state.

The volume ratio "v:100-v" of the positive-electrode active material particles 204 to the halide solid electrolyte material in the positive electrode 201 may satisfy 30≤v≤95. v<30 may result in the battery with an insufficient energy density. v>95 may make high-power operation difficult.

The positive electrode 201 may have a thickness in the range of 10 to 500 μm. The positive electrode 201 with a thickness of less than 10 μm may result in the battery with an insufficient energy density. The positive electrode 201 with a thickness of more than 500 μm may make high-power operation difficult.

The electrolyte layer 202 contains an electrolyte material. The electrolyte material is a solid electrolyte material, for example. Thus, the electrolyte layer 202 may be a solid electrolyte layer.

The solid electrolyte layer may contain the solid electrolyte material according to the first embodiment as a main component. More specifically, the weight ratio of the solid electrolyte material according to the first embodiment to the solid electrolyte layer is 50% or more (50% or more by weight), for example.

Such a structure can further improve the charge-discharge characteristics of the battery.

The weight ratio of the solid electrolyte material according to the first embodiment to the solid electrolyte layer is 70% or more (70% or more by weight), for example.

Such a structure can further improve the charge-discharge characteristics of the battery.

In addition to the solid electrolyte material according to the first embodiment contained as a main component, the solid electrolyte layer may contain incidental impurities, or starting materials for the synthesis of the solid electrolyte material, by-products, and degradation products.

The weight ratio of the solid electrolyte material according to the first embodiment to the solid electrolyte layer except incidental impurities may be 100% (100% by weight).

Such a structure can further improve the charge-discharge characteristics of the battery.

Thus, the solid electrolyte layer may be composed of the solid electrolyte material according to the first embodiment alone.

Alternatively, the solid electrolyte layer may be composed only of a solid electrolyte material different from the solid electrolyte material according to the first embodiment. The solid electrolyte material different from the solid electrolyte material according to the first embodiment is $Li_2MgX_4$, $Li_2FeX_4$, $Li(Al, Ga, In)X_4$, $Li_3(Al, Ga, In)X_6$, or LiI (X: Cl, Br, I), for example.

The solid electrolyte layer may contain both the solid electrolyte material according to the first embodiment and the solid electrolyte material different from the solid electrolyte material according to the first embodiment. Both of them may be uniformly dispersed. A layer of the solid electrolyte material according to the first embodiment and a layer of the solid electrolyte material different from the solid electrolyte material according to the first embodiment may be located in order in the lamination direction of the battery.

The solid electrolyte layer may have a thickness in the range of 1 to 1000 μm. The solid electrolyte layer with a thickness of less than 1 μm is more likely to cause a short circuit between the positive electrode 201 and the negative electrode 203. The solid electrolyte layer with a thickness of more than 1000 μm may make high-power operation difficult.

The negative electrode 203 contains a material that can adsorb and desorb metal ions (for example, lithium ions). The negative electrode 203 contains a negative-electrode active material (for example, the negative-electrode active material particles 205), for example.

The negative-electrode active material may be a metallic material, carbon material, oxide, nitride, tin compound, or silicon compound. The metallic material may be a single metal. Alternatively, the metallic material may be an alloy. Examples of the metallic material include lithium metal and lithium alloys. Examples of the carbon material include natural graphite, coke, carbon during graphitization, carbon fiber, spherical carbon, artificial graphite, and amorphous carbon. From the perspective of capacity density, silicon (Si), tin (Sn), silicon compounds, and tin compounds may be used. The use of a negative-electrode active material with a low average reaction voltage enhances the electrolysis-suppressing effect of the solid electrolyte material according to the first embodiment.

The negative-electrode active material particles 205 may have a median size in the range of 0.1 to 100 μm. The negative-electrode active material particles 205 with a median size of less than 0.1 μm in the negative electrode, together with the solid electrolyte particles 100, may not achieve a satisfactory dispersion state. This results in the battery with poor charge-discharge characteristics. The negative-electrode active material particles 205 with a median size of more than 100 μm results in slow lithium diffusion in the negative-electrode active material particles 205. This may make the high-power operation of the battery difficult.

The negative-electrode active material particles 205 may have a larger median size than the solid electrolyte particles 100. In such a case, the negative-electrode active material particles 205 and the halide solid electrolyte material can achieve a satisfactory dispersion state.

The volume ratio "v:100-v" of the negative-electrode active material particles 205 to the solid electrolyte particles 100 in the negative electrode 203 may satisfy 30≤v≤95. v<30 may result in the battery with an insufficient energy density. v>95 may make high-power operation difficult.

The negative electrode 203 may have a thickness in the range of 10 to 500 μm. A negative electrode with a thickness of less than 10 μm may result in a battery with an insufficient energy density. A negative electrode with a thickness of more than 500 μm may make high-power operation difficult.

At least one of the positive electrode 201, the electrolyte layer 202, and the negative electrode 203 may contain a sulfide solid electrolyte or an oxide solid electrolyte to improve ionic conductivity, chemical stability, or electrochemical stability. The sulfide solid electrolyte may be $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, or $Li_{10}GeP_2S_{12}$. The oxide solid electrolyte may be a NASICON-type solid electrolyte, exemplified by $LiTi_2(PO_4)_3$ or an element-substituted product thereof, a $(LaLi)TiO_3$ perovskite solid electrolyte, a LISICON-type solid electrolyte, exemplified by $Li_{14}ZnGe_4O_{16}$, $Li_4SiO_4$, $LiGeO_4$, or an element-substituted product thereof, a garnet solid electrolyte, exemplified by $Li_7La_3Zr_2O_{12}$ or an element-substituted product thereof, $Li_3N$ or a H-substituted product thereof, or $Li_3PO_4$ or a N-substituted product thereof.

At least one of the positive electrode 201, the electrolyte layer 202, and the negative electrode 203 may contain an organic polymer solid electrolyte to improve ionic conductivity. The organic polymer solid electrolyte may be a compound of a polymer and a lithium salt. The polymer may have an ethylene oxide structure. The ethylene oxide structure can increase the lithium salt content and ionic conductivity. Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. A lithium salt selected from these may be used alone. A mixture of two or more lithium salts selected from these may also be used.

At least one of the positive electrode 201, the electrolyte layer 202, and the negative electrode 203 may contain a non-aqueous electrolyte solution, a gel electrolyte, or an ionic liquid to facilitate lithium ion transfer and improve the output characteristics of the battery.

The non-aqueous electrolyte solution contains a non-aqueous solvent and a lithium salt dissolved in the non-aqueous solvent. Examples of the non-aqueous solvent include cyclic carbonate solvents, chain carbonate solvents, cyclic ether solvents, chain ether solvents, cyclic ester solvents, chain ester solvents, and fluorinated solvents. Examples of the cyclic carbonate solvents include ethylene carbonate, propylene carbonate, and butylene carbonate.

Examples of the chain carbonate solvents include dimethyl carbonate, ethyl methyl carbonate, and diethyl carbonate. Examples of the cyclic ether solvents include tetrahydrofuran, 1,4-dioxane, and 1,3-dioxolane. Examples of the chain ether solvents include 1,2-dimethoxyethane and 1,2-diethoxyethane. Examples of the cyclic ester solvents include γ-butyrolactone. Examples of the chain ester solvents include methyl acetate. Examples of the fluorinated solvents include fluoroethylene carbonate, methyl fluoropropionate, fluorobenzene, fluoroethyl methyl carbonate, and fluorodimethylene carbonate. One non-aqueous solvent selected from these may be used alone. A combination of two or more non-aqueous solvents selected from these may also be used. The non-aqueous electrolyte solution may contain at least one fluorinated solvent selected from the group consisting of fluoroethylene carbonate, methyl fluoropropionate, fluorobenzene, fluoroethyl methyl carbonate, and fluorodimethylene carbonate. Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. A lithium salt selected from these may be used alone. A mixture of two or more lithium salts selected from these may also be used. The concentration of the lithium salt ranges from 0.5 to 2 mol/l, for example.

The gel electrolyte may be a polymer material containing a non-aqueous electrolyte solution. The polymer material may be poly(ethylene oxide), polyacrylonitrile, poly(vinylidene difluoride), poly(methyl methacrylate), or a polymer having an ethylene oxide bond.

A cation in the ionic liquid may be an aliphatic chain quaternary salt, such as tetraalkylammonium or tetraalkylphosphonium, an alicyclic ammonium, such as pyrrolidinium, morpholinium, imidazolinium, tetrahydropyrimidinium, piperazinium, or piperidinium, or a nitrogen-containing heteroaromatic cation, such as pyridinium or imidazolium. An anion in the ionic liquid may be $PF_6^-$, $BF_4^-$, $SbF^-$, $AsF^-$, $SO_3CF_3^-$, $N(SO_2CF_3)_2^-$, $N(SO_2C_2F_5)_2^-$, $N(SO_2CF_3)(SO_2C_4F_9)^-$, or $C(SO_2CF_3)_3$. The ionic liquid may contain a lithium salt.

At least one of the positive electrode 201, the electrolyte layer 202, and the negative electrode 203 may contain a binder to improve adhesion between particles. The binder is used to improve the binding property of a material constituting the electrode. Examples of the binder include polyvinylidene difluoride, polytetrafluoroethylene, polyethylene, polypropylene, aramid resin, polyamide, polyimide, polyamideimide, polyacrylonitrile, polyacrylic acid, methyl polyacrylate ester, ethyl polyacrylate ester, hexyl polyacrylate ester, polymethacrylic acid, methyl polymethacrylate ester, ethyl polymethacrylate ester, hexyl polymethacrylate ester, polyvinyl acetate, polyvinylpyrrolidone, polyether, polyethersulfone, hexafluoropolypropylene, styrene-butadiene rubber, and carboxymethylcellulose. Other examples of the binder include copolymers of two or more materials selected from tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene. A mixture of two or more selected from these may also be used as a binder.

At least one of the positive electrode 201 and the negative electrode 203 may contain a conductive agent, if necessary.

The conductive agent is used to reduce the electrode resistance. Examples of the conductive agent include graphite, such as natural graphite and artificial graphite, carbon black, such as acetylene black and Ketjen black, electrically conductive fiber, such as carbon fiber and metal fiber, metal powders, such as fluorocarbon and aluminum, electrically conductive whiskers, such as zinc oxide and potassium titanate, electrically conductive metal oxides, such as titanium oxide, and electrically conductive polymers, such as polyaniline, polypyrrole, and polythiophene. The use of a carbon conductive agent as the conductive agent can reduce costs.

The battery according to the second embodiment may be of various types, such as a coin type, a cylindrical type, a square or rectangular type, a sheet type, a button type, a flat type, or a layered type.

EXAMPLES

The present disclosure is described in detail in the following examples and comparative examples.

Example 1

[Preparation of Solid Electrolyte Material]

Raw powders LiCl and $YCl_3$ were weighed at a mole ratio of $LiCl:YCl_3=2.7:1.1$ in an argon atmosphere with a dew point of −60° C. or less. The raw powders were ground and mixed in a mortar. The mixture was then milled in a planetary ball mill at 600 rpm for 25 hours. The mixture was fired in an Ar (argon) atmosphere in a furnace at 400° C. for 48 hours.

Thus, a powder of a solid electrolyte material containing a Li-deficient crystal phase according to Example 1 was prepared.

[Evaluation of Lithium Ion Conductivity]

Figure 3:
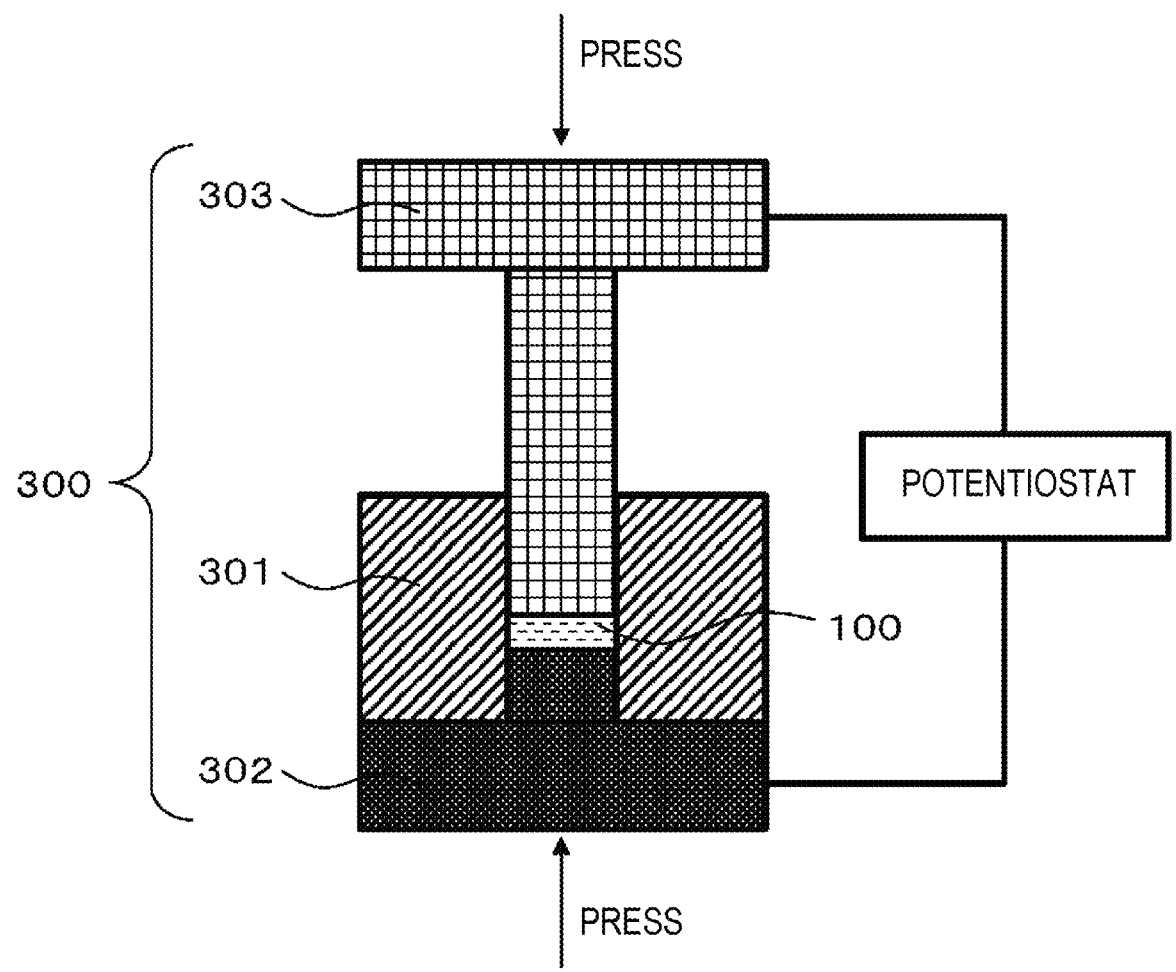
FIG. 3 is a schematic view of a method for evaluating ionic conductivity.

FIG. 3 is a schematic view of a method for evaluating ionic conductivity.

A press forming die 300 includes an electronically insulated polycarbonate frame 301, an electron-conductive stainless steel upper punch 303, and an electron-conductive stainless steel lower punch 302.

The apparatus illustrated in FIG. 3 was used to evaluate ionic conductivity by the following method.

The powder of the solid electrolyte material according to Example 1 was loaded in the press forming die 300 in a dry atmosphere with a dew point of −30° C. or less and was uniaxially pressed at 400 MPa to produce a conductivity measurement cell according to Example 1.

Under pressure, the upper punch 303 and the lower punch 302 were coupled through a lead wire to a potentiostat (Princeton Applied Research, VersaSTAT4) equipped with a frequency response analyzer. The ionic conductivity at room temperature was measured by an electrochemical impedance measurement method.

The ionic conductivity of the solid electrolyte material according to Example 1 measured at 22° C. was $3.0 \times 10^{-4}$ S/cm.

[Evaluation of Phase Transition]

Figure 4:
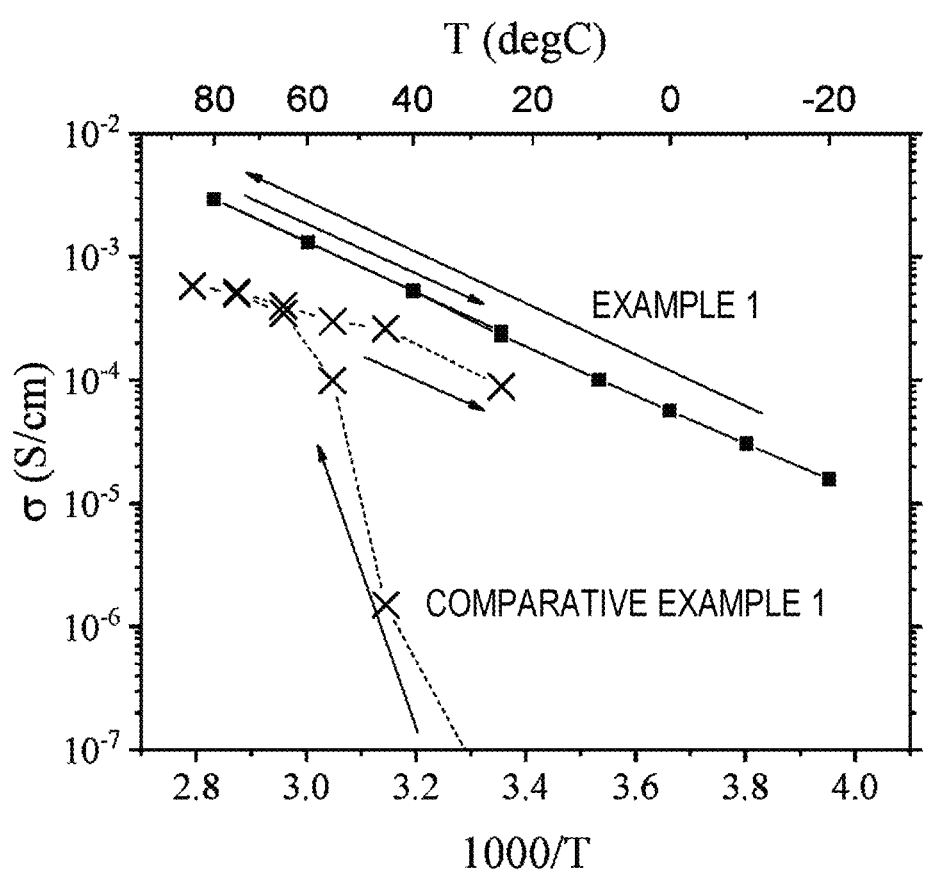
FIG. 4 is a graph of the temperature dependence of the ionic conductivity of solid electrolytes.

FIG. 4 is a graph of the temperature dependence of the ionic conductivity of solid electrolytes.

The results in FIG. 4 were obtained by the following method.

The conductivity measurement cell according to Example 1 was placed in a thermostatic chamber. The temperature dependence of conductivity was measured at a temperature in the range of −20° C. to 80° C. during temperature rise and drop.

As shown in FIG. 4, a sudden change in conductivity indicating a phase change (that is, phase transition) was not observed.

[Analysis of Crystal Structure]

Figure 5:
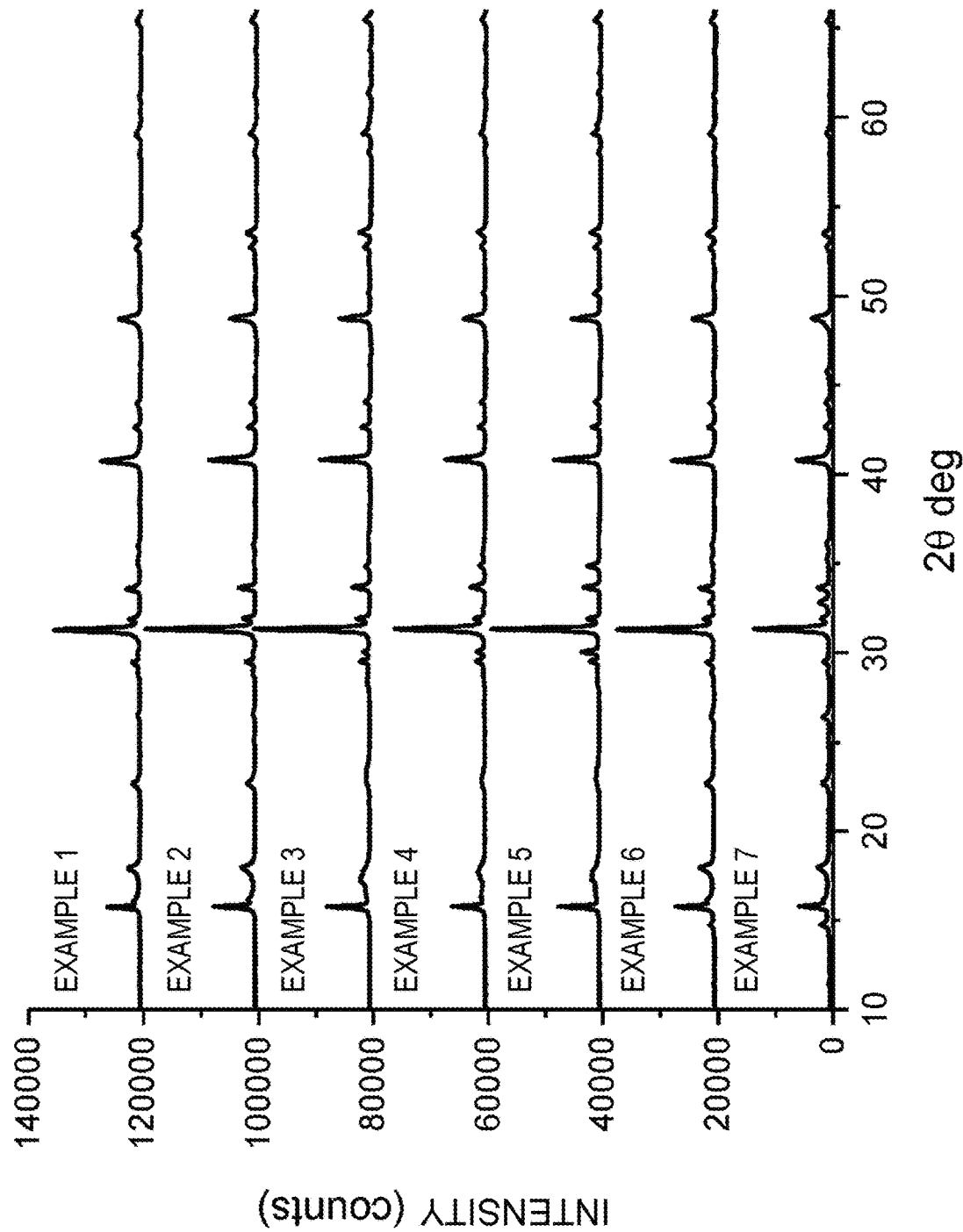
FIG. 5 is a graph of XRD patterns.

FIG. 5 is a graph of XRD patterns.

The results in FIG. 5 were obtained by the following method.

To analyze the crystal structure of a solid electrolyte, the X-ray diffraction pattern of the solid electrolyte was measured with an X-ray diffractometer (Rigaku Corporation, MiniFlex600) in a dry environment with a dew point of −45° C. or less. Cu-Kα radiation was used as an X-ray source. More specifically, the X-ray diffraction was measured by the θ-2θ method using Cu-Kα radiation (wavelengths of 1.5405 and 1.5444 angstroms) as X-rays.

In the X-ray diffraction pattern of Example 1, relatively intense peaks were observed at 15.74, 31.28, 40.76, 48.68, 53.46, and 59.08 degrees.

These peaks corresponded approximately to part of the peak positions of the X-ray diffraction pattern of an LYC phase with lattice constants a=12.94 angstroms, b=11.21 angstroms, c=6.06 angstroms, α=90 degrees, β=90 degrees, and γ=90 degrees.

The relationship FWHM/$2θ_p$ between the full width at half maximum (FWHM) and the peak central value $2θ_p$ of the peak at 2θ=31.28 degrees was 0.68%.

A peak indicating the presence of a phase other than the first crystal phase, such as a diffraction peak derived from LiCl or a diffraction peak derived from $YCl_3$, was not observed.

The Li content per unit weight of the solid electrolyte material according to Example 1 was measured by atomic absorption spectrometry, and the Y content was measured by ICP emission spectrometry. The Li and Y contents were converted to the mole ratio $x_{Li,Total}/x_{Y,Total}$. $x_{Li,Total}/x_{Y,Total}$ was 2.62. Thus, the solid electrolyte material according to Example 1 had a composition formula including a Li-deficient first crystal phase represented by the composition formula $Li_{2.80}Y_{1.07}Cl_6$.

[Production of Secondary Battery]

The solid electrolyte material according to Example 1 and an active material $LiCoO_2$ were weighed at a volume ratio of 70:30 in an argon glove box.

They were mixed in an agate mortar to prepare a mixture.

The solid electrolyte material according to Example 1 in an amount corresponding to a thickness of 700 μm, 8.5 mg of the mixture, and 11.5 mg of an Al powder were stacked in this order in an insulating tube. The stack was pressed at 300 MPa to prepare a first electrode and a solid electrolyte layer.

Subsequently, a metal In (thickness: 200 μm) was placed on a surface of the solid electrolyte layer opposite the first electrode. The stack was pressed at a pressure of 80 MPa to prepare a laminate composed of the first electrode, the solid electrolyte layer, and a second electrode.

Subsequently, a stainless steel current collector was placed on the top and bottom of the laminate and was coupled to a collector lead.

Finally, the interior of the insulating tube was sealed with an insulating ferrule and was isolated from the outside atmosphere.

Thus, a secondary battery according to Example 1 was produced.

[Charge-Discharge Test]

Figure 6:
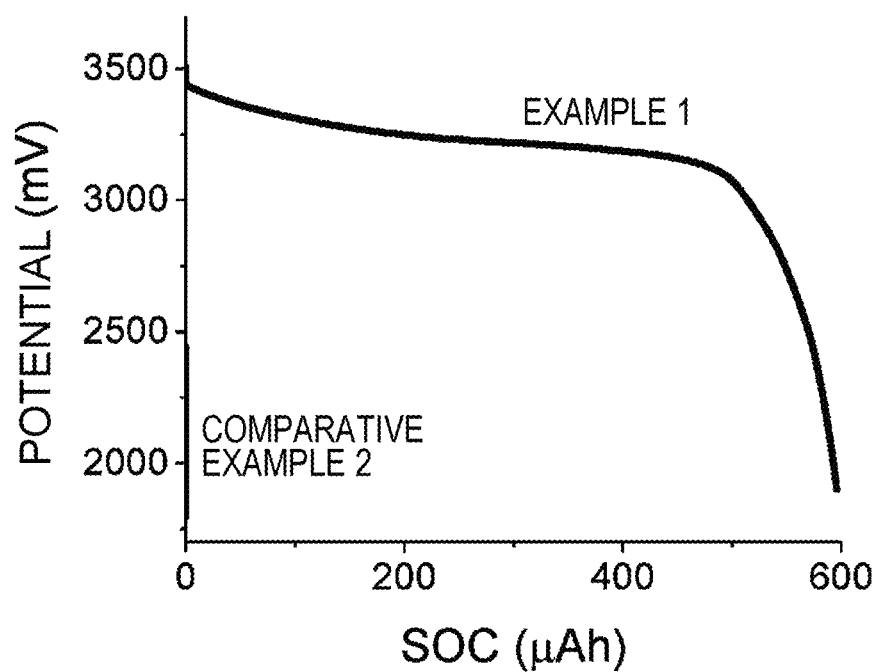
FIG. 6 is a graph of initial discharging characteristics.

FIG. 6 is a graph of initial discharging characteristics.

The results in FIG. 6 were obtained by the following method.

The secondary battery according to Example 1 was placed in a thermostatic chamber at 25° C.

The battery was charged to a voltage of 3.6 V at a constant current rate of 0.05 C (20 hour rate) with respect to its theoretical capacity.

The battery was then discharged to a voltage of 1.9 V at the same current rate of 0.05 C.

The measurements showed that the secondary battery according to Example 1 had an initial discharge capacity of 596 μAh.

Example 2

Raw powders LiCl and $YCl_3$ of a solid electrolyte were mixed at a mole ratio of $LiCl:YCl_3$=2.85:1.05.

Except for this, the synthesis, evaluation, and analysis were performed in the same manner as in Example 1.

The ionic conductivity measured at 22° C. was $1.8×10^{-4}$ S/cm.

A sudden change in conductivity indicating a phase change (that is, phase transition) was not observed at a temperature in the range of −30° C. to 80° C.

FIG. 5 shows an XRD pattern of a solid electrolyte material according to Example 2.

In the X-ray diffraction pattern of Example 2, relatively intense peaks were observed at 2θ of 15.78, 31.32, 40.82, 48.72, 53.54, and 59.1 degrees.

These peaks corresponded approximately to part of the peak positions of the X-ray diffraction pattern of an LYC phase with lattice constants a=12.93 angstroms, b=11.20 angstroms, c=6.04 angstroms, α=90 degrees, β=90 degrees, and γ=90 degrees.

The relationship FWHM/$2θ_p$ between the full width at half maximum (FWHM) and the peak central value $2θ_p$ of the peak at 2θ=31.32 degrees was 0.63%.

A peak indicating the presence of a phase other than the first crystal phase, such as a diffraction peak derived from LiCl or a diffraction peak derived from $YCl_3$, was not observed.

The ratio $x_{Li,Total}/x_{Y,Total}$ of the Li content to the Y content in the solid electrolyte material according to Example 2 was 2.90. Thus, the solid electrolyte material according to Example 2 had a composition formula including a Li-deficient first crystal phase represented by the composition formula $Li_{2.95}Y_{1.02}Cl_6$.

The solid electrolyte material according to Example 2 was used as a solid electrolyte used in a mixture and in a solid electrolyte layer.

Except for this, the production of a secondary battery and the charge-discharge test were performed in the same manner as in Example 1.

The secondary battery according to Example 2 had an initial discharge capacity of 532 μAh.

Example 3

Raw powders LiCl and YCl$_3$ of a solid electrolyte were mixed at a mole ratio of LiCl:YCl$_3$=2.91:1.03.

Except for this mixing ratio and the Rietveld analysis described later, the synthesis, evaluation, and analysis were performed in the same manner as in Example 1.

The ionic conductivity measured at 22° C. was 7.6×10$^{-5}$ S/cm.

A sudden change in conductivity indicating a phase change (that is, phase transition) was not observed at a temperature in the range of −30° C. to 80° C.

FIG. 5 shows an XRD pattern of a solid electrolyte material according to Example 3.

In the X-ray diffraction pattern of Example 3, relatively intense peaks were observed at 2θ of 15.76, 31.32, 40.84, 48.70, 53.58, and 59.08 degrees.

These peaks corresponded approximately to part of the peak positions of the X-ray diffraction pattern of an LYC phase with lattice constants a=12.93 angstroms, b=11.20 angstroms, c=6.04 angstroms, α=90 degrees, β=90 degrees, and γ=90 degrees.

The relationship FWHM/2θ$_p$ between the full width at half maximum (FWHM) and the peak central value 2θ$_p$ of the peak at 2θ=31.32 degrees was 0.58%.

In addition to the peaks derived from the first crystal phase, peaks derived from LiCl were observed at 2θ of 30.04, 34.84, and 50.14 degrees.

The ratio $x_{Li,Total}/x_{Y,Total}$ of the Li content to the Y content in the solid electrolyte material according to Example 3 was 3.0. Due to the deposition of the LiCl phase, the ratio of the Li content to the Y content in the LYC phase was smaller than the total content ratio 3.0. Thus, the solid electrolyte material according to Example 3 contained a Li-deficient first crystal phase.

To determine the Li deficiency in the first crystal phase, the XRD pattern in FIG. 5 was subjected to the Rietveld analysis. RIETAN-FP (see F. Izumi and K. Momma, "Three-dimensional visualization in powder diffraction," Solid State Phenom., 130, 15-20 (2007)) was used in the Rietveld analysis. The phase 1 model structure was the LYC structure (space group Pnma) in which Yb was substituted by Y, and the phase 2 model structure was LiCl (space group Fm-3m). The parameters of the scale factor, background function, and profile function and the parameters of the crystal structure were optimized by fitting. The Rietveld analysis showed that the phase fractions of the LYC phase and the LiCl phase was $x_{LYC}:x_{LiCl}$=0.79:0.21 based on the mole ratio.

From the evaluation results, the composition formula Li$_{3-3\delta}$Y$_{1+\delta}$Cl$_6$ in the first crystal phase of the solid electrolyte material according to Example 3 was determined by calculating δ using the following formula (A1).

$$(x_{Li,Total}/x_{Y,Total})(1+\delta)=x_{LiCl}/x_{LYC}+(3-3\delta) \quad \text{formula (A1)}$$

Using the formula (A1), δ (Li deficiency was 3δ) in the first crystal phase of the solid electrolyte material according to Example 3 was calculated to be 0.041. Thus, the solid electrolyte material according to Example 3 had a composition formula including a Li-deficient first crystal phase represented by the composition formula Li$_{2.88}$Y$_{1.04}$Cl$_6$.

The solid electrolyte material according to Example 3 was used as a solid electrolyte used in a mixture and in a solid electrolyte layer.

Except for this, the production of a secondary battery and the charge-discharge test were performed in the same manner as in Example 1.

The secondary battery according to Example 3 had an initial discharge capacity of 540 μAh.

Example 4

Raw powders LiCl and YCl$_3$ of a solid electrolyte were mixed at a mole ratio of LiCl:YCl$_3$=3:1.

Except for this, the synthesis, evaluation, and analysis were performed in the same manner as in Example 3.

The ionic conductivity measured at 22° C. was 8.0×10$^{-5}$ S/cm.

A sudden change in conductivity indicating a phase change (that is, phase transition) was not observed at a temperature in the range of −30° C. to 80° C.

FIG. 5 shows an XRD pattern of a solid electrolyte material according to Example 4.

In the X-ray diffraction pattern of Example 4, relatively intense peaks were observed at 2θ of 15.78, 31.34, 40.84, 48.72, 53.56, and 59.10 degrees.

These peaks corresponded approximately to part of the peak positions of the X-ray diffraction pattern of an LYC phase with lattice constants a=12.91 angstroms, b=11.21 angstroms, c=6.04 angstroms, α=90 degrees, β=90 degrees, and γ=90 degrees.

The relationship FWHM/2θ$_p$ between the full width at half maximum (FWHM) and the peak central value 2θ$_p$ of the peak at 2θ=31.34 degrees was 0.67%.

In addition to the peaks derived from the first crystal phase, peaks derived from LiCl were observed at 2θ of 30.04, 34.84, and 50.14 degrees.

The ratio $x_{Li,Total}/x_{Y,Total}$ of the Li content to the Y content in the solid electrolyte material according to Example 4 was 3.18.

The XRD pattern in FIG. 5 was subjected to the Rietveld analysis in the same manner as in Example 3. The Rietveld analysis showed that the phase fractions of the LYC phase and the LiCl phase was $x_{LYC}:x_{LiCl}$=0.74:0.26 based on the mole ratio.

From the evaluation results, δ (Li deficiency was 3δ) of the composition formula Li$_{3-3\delta}$Y$_{1+\delta}$Cl$_6$ in the first crystal phase of the solid electrolyte material according to Example 4 was calculated to be 0.027 using the formula (A1). Thus, the solid electrolyte material according to Example 4 had a composition formula including a Li-deficient first crystal phase represented by the composition formula Li$_{2.92}$Y$_{1.03}$Cl$_6$.

The solid electrolyte material according to Example 4 was used as a solid electrolyte used in a mixture and in a solid electrolyte layer.

Except for this, the production of a secondary battery and the charge-discharge test were performed in the same manner as in Example 1.

The secondary battery according to Example 4 had an initial discharge capacity of 469 μAh.

Example 5

Raw powders LiCl and YCl$_3$ of a solid electrolyte were mixed at a mole ratio of LiCl:YCl$_3$=3.3:0.9.

Except for this, the synthesis, evaluation, and analysis were performed in the same manner as in Example 3.

The ionic conductivity measured at 22° C. was 7.2×10$^{-5}$ S/cm.

A sudden change in conductivity indicating a phase change (that is, phase transition) was not observed at a temperature in the range of −30° C. to 80° C.

FIG. 5 shows an XRD pattern of a solid electrolyte material according to Example 5.

In the X-ray diffraction pattern of Example 5, relatively intense peaks were observed at 2θ of 15.78, 31.32, 40.82, 48.70, 53.56, and 59.08 degrees.

These peaks corresponded approximately to part of the peak positions of the X-ray diffraction pattern of an LYC phase with lattice constants a=12.93 angstroms, b=11.20 angstroms, c=6.04 angstroms, α=90 degrees, β=90 degrees, and γ=90 degrees.

The relationship FWHM/2θ$_p$ between the full width at half maximum (FWHM) and the peak central value 2θ$_p$ of the peak at 2θ=31.32 degrees was 0.54%.

In addition to the peaks derived from the first crystal phase, peaks derived from LiCl were observed at 2θ of 30.04, 34.84, and 50.14 degrees.

The ratio $x_{Li,Total}/x_{Y,Total}$ of the Li content to the Y content in the solid electrolyte material according to Example 5 was 3.92.

The XRD pattern in FIG. 5 was subjected to the Rietveld analysis in the same manner as in Example 3. The Rietveld analysis showed that the phase fractions of the LYC phase and the LiCl phase was $x_{LYC}:x_{LiCl}$=0.50:0.50 based on the mole ratio.

From the evaluation results, δ (Li deficiency was 3δ) of the composition formula $Li_{3-3δ}Y_{1+δ}Cl_6$ in the first crystal phase of the solid electrolyte material according to Example 5 was calculated to be 0.010 using the formula (A1). Thus, the solid electrolyte material according to Example 5 had a composition formula including a Li-deficient first crystal phase represented by the composition formula $Li_{2.97}Y_{1.01}Cl_6$.

The solid electrolyte material according to Example 5 was used as a solid electrolyte used in a mixture and in a solid electrolyte layer.

Except for this, the production of a secondary battery and the charge-discharge test were performed in the same manner as in Example 1.

The secondary battery according to Example 5 had an initial discharge capacity of 528 μAh.

Example 6

Raw powders LiCl and YCl$_3$ of a solid electrolyte were mixed at a mole ratio of LiCl:YCl$_3$=2.55:1.15.

Except for the mixing ratio and the Rietveld analysis conditions, the synthesis, evaluation, and analysis were performed in the same manner as in Example 3.

The ionic conductivity measured at 22° C. was 2.6×10$^{-4}$ S/cm.

A sudden change in conductivity indicating a phase change (that is, phase transition) was not observed at a temperature in the range of −30° C. to 80° C.

FIG. 5 shows an XRD pattern of a solid electrolyte material according to Example 6.

In the X-ray diffraction pattern of Example 6, relatively intense peaks were observed at 2θ of 15.76, 31.30, 40.78, 48.70, 53.46, and 59.08 degrees. These peaks corresponded approximately to part of the peak positions of the X-ray diffraction pattern of an LYC phase with lattice constants a=12.94 angstroms, b=11.19 angstroms, c=6.05 angstroms, α=90 degrees, β=90 degrees, and γ=90 degrees.

The relationship FWHM/2θ$_p$ between the full width at half maximum (FWHM) and the peak central value 2θ$_p$ of the peak at 2θ=31.30 degrees was 0.67%.

In addition to the peaks derived from the first crystal phase, peaks derived from YCl$_3$ were observed at 2θ of 14.76, 26.42, and 32.84 degrees.

The ratio $x_{Li,Total}/x_{Y,Total}$ of the Li content to the Y content in the solid electrolyte material according to Example 6 was 2.37.

The XRD pattern in FIG. 5 was subjected to the Rietveld analysis. The Rietveld analysis was performed in the same manner as in Example 3 except that YCl$_3$ (space group C2/m) was employed as the phase 2 model structure. The Rietveld analysis showed that the phase fractions of the LYC phase and the YCl$_3$ phase was $x_{LYC}:x_{YCl3}$=0.94:0.06 based on the mole ratio.

From the evaluation results, the composition formula $Li_{3-3δ}Y_{1+δ}Cl_6$ in the first crystal phase of the solid electrolyte material according to Example 6 was determined by calculating δ using the following formula (A2).

$$(x_{Y,Total}/x_{Li,Total})(3-3δ)=x_{YCl3}/x_{LYC}+(1+δ)$$ formula (A2)

Using the formula (A2), δ (Li deficiency was 3δ) in the first crystal phase of the solid electrolyte material according to Example 6 was calculated to be 0.088. Thus, the solid electrolyte material according to Example 6 had a composition formula including a Li-deficient first crystal phase represented by the composition formula $Li_{2.74}Y_{1.09}Cl_6$.

The solid electrolyte material according to Example 6 was used as a solid electrolyte used in a mixture and in a solid electrolyte layer.

Except for this, the production of a secondary battery and the charge-discharge test were performed in the same manner as in Example 1.

The secondary battery according to Example 6 had an initial discharge capacity of 519 μAh.

Example 7

Raw powders LiCl and YCl$_3$ of a solid electrolyte were mixed at a mole ratio of LiCl:YCl$_3$=2.25:1.25.

Except for this, the synthesis, evaluation, and analysis were performed in the same manner as in Example 6.

The ionic conductivity measured at 22° C. was 1.8×10$^{-4}$ S/cm.

A sudden change in conductivity indicating a phase change (that is, phase transition) was not observed at a temperature in the range of −30° C. to 80° C.

FIG. 5 shows an XRD pattern of a solid electrolyte material according to Example 7.

In the X-ray diffraction pattern of Example 7, relatively intense peaks were observed at 2θ of 15.80, 31.32, 40.8, 48.74, 53.48, and 59.12 degrees. These peaks corresponded approximately to the X-ray diffraction peak positions of an LYC phase with lattice constants a=12.94 angstroms, b=11.18 angstroms, c=6.05 angstroms, α=90 degrees, β=90 degrees, and γ=90 degrees.

The relationship FWHM/2θ$_p$ between the full width at half maximum (FWHM) and the peak central value 2θ$_p$ of the peak at 2θ=31.32 degrees was 0.67%.

In addition to the peaks derived from the first crystal phase, peaks derived from YCl$_3$ were observed at 2θ of 14.76, 26.42, and 32.84 degrees.

The ratio $x_{Li,Total}/x_{Y,Total}$ of the Li content to the Y content in the solid electrolyte material according to Example 7 was 1.94.

The XRD pattern in FIG. 5 was subjected to the Rietveld analysis in the same manner as in Example 6. The Rietveld analysis showed that the phase fractions of the LYC phase and the YCl$_3$ phase was $x_{LYC}:x_{YCl3}$=0.83:0.17 based on the mole ratio.

From the evaluation results, δ (Li deficiency was 3δ) of the composition formula $Li_{3-3δ}Y_{1+δ}Cl_6$ in the first crystal phase of the solid electrolyte material according to Example 7 was calculated to be 0.133 using the formula (A2). Thus, the solid electrolyte material according to Example 7 had a composition formula including a Li-deficient first crystal phase represented by the composition formula $Li_{2.60}Y_{1.13}Cl_6$.

The solid electrolyte material according to Example 7 was used as a solid electrolyte used in a mixture and in a solid electrolyte layer.

Except for this, the production of a secondary battery and the charge-discharge test were performed in the same manner as in Example 1.

The secondary battery according to Example 7 had an initial discharge capacity of 478 μAh.

Comparative Example 1

Raw powders LiBr and $InBr_3$ were weighed at a mole ratio of $LiBr:InBr_3=3:1$ in a dry atmosphere with a dew point of −30° C. or less. The raw powders were ground and mixed in a mortar. The sample was pressed into pellets, was put into a glass tube under vacuum, and was fired at 200° C. for one week.

Thus, a solid electrolyte material $Li_3InBr_6$ according to Comparative Example 1 was prepared.

Except for this, the ionic conductivity and phase transition were evaluated in the same manner as in Example 1.

The ionic conductivity measured at 22° C. was less than $1×10^{-7}$ S/cm.

FIG. 4 shows the temperature dependence of ionic conductivity of the solid electrolyte material according to Comparative Example 1.

As shown in FIG. 4, the conductivity changed rapidly at approximately 55° C. during temperature rise due to the temperature dependence of conductivity. Thus, a phase change was observed in the solid electrolyte material according to Comparative Example 1.

Comparative Example 2

Raw powders LiCl and $FeCl_2$ of a solid electrolyte were mixed at a mole ratio of $LiCl:FeCl_2=2:1$. Thus, a solid electrolyte material $Li_2FeCl_4$ according to Comparative Example 2 was prepared.

Except for this, the ionic conductivity was evaluated in the same manner as in Example 1.

The measured ionic conductivity was $8.7×10^{-6}$ S/cm.

The solid electrolyte material according to Comparative Example 2 was used as a solid electrolyte used in a mixture and in a solid electrolyte layer.

Except for this, the production of a secondary battery and the charge-discharge test were performed in the same manner as in Example 1.

FIG. 6 shows the initial discharging characteristics of the secondary battery according to Comparative Example 2.

The secondary battery according to Comparative Example 2 had an initial discharge capacity of less than 1 μAh. In other words, the charge-discharge operation of the secondary battery according to Comparative Example 2 could not be observed.

Table 1 shows the structures and evaluation results of Examples 1 to 7 and Comparative Examples 1 and 2.

TABLE 1

| | Total Li/Y ratio (total composition) | XRD peak | Crystal phase | Li/Y ratio in first crystal phase (composition) | FWHM/2θ$_p$ | Conductivity (S/cm) | Phase transition | Initial discharge capacity (μAh) |
|---|---|---|---|---|---|---|---|---|
| Example 1 | 2.62 ($Li_{2.80}Y_{1.07}Cl_6$) | 15.74°, 31.28°, 40.76°, 48.68°, 53.46°, 59.08° | First crystal phase single phase | 2.62 ($Li_{2.80}Y_{1.07}Cl_6$) | 0.68% | 3.0e−4 | No | 596 |
| Example 2 | 2.90 ($Li_{2.95}Y_{1.02}Cl_6$) | 15.78°, 31.32°, 40.82°, 48.72°, 53.54°, 59.1° | First crystal phase single phase | 2.90 ($Li_{2.95}Y_{1.02}Cl_6$) | 0.63% | 1.8e−4 | No | 532 |
| Example 3 | 3.0 ($Li_3Y_1Cl_6$) | 15.76°, 31.32°, 40.84°, 48.70°, 53.58°, 59.08°, and, 30.04°, 34.84°, 50.14° | First crystal phase + LiCl phase | 2.76 ($Li_{2.88}Y_{1.04}Cl_6$) | 0.58% | 7.6e−5 | No | 540 |
| Example 4 | 3.18 ($Li_{3.09}Y_{0.97}Cl_6$) | 15.78°, 31.34°, 40.84°, 48.72°, 53.56°, 59.10°, and, 30.04°, 34.84°, 50.14° | First crystal phase + LiCl phase | 2.84 ($Li_{2.92}Y_{1.03}Cl_6$) | 0.67% | 8.0e−5 | No | 469 |
| Example 5 | 3.92 ($Li_{3.40}Y_{0.87}Cl_6$) | 15.78°, 31.32°, 40.82°, 48.70°, 53.56°, 59.08°, and, 30.04°, 34.84°, 50.14° | First crystal phase + LiCl phase | 2.94 ($Li_{2.97}Y_{1.01}Cl_6$) | 0.54% | 7.2e−5 | No | 528 |
| Example 6 | 2.37 ($Li_{2.65}Y_{1.12}Cl_6$) | 15.76°, 31.30°, 40.78°, 48.70°, 53.46°, 59.08°, and, 14.76°, 26.42°, 32.84° | First crystal phase +$YCl_3$ phase | 2.51 ($Li_{2.74}Y_{1.09}Cl_6$) | 0.67% | 2.6e−4 | No | 519 |
| Example 7 | 1.94 ($Li_{2.36}Y_{1.22}Cl_6$) | 15.80°, 31.32°, 40.80°, 48.74°, 53.48°, 59.12°, and, 14.76°, 26.42°, 32.84° | First crystal phase + YCl3 phase | 2.30 ($Li_{2.60}Y_{1.13}Cl_6$) | 0.67% | 1.8e−4 | No | 478 |
| Comparative example 1 | $Li_3InBr_6$ | N/A | Unidentified | N/A | N/A | <1e−7 | Yes | — |
| Comparative example 2 | $Li_2FeCl_4$ | N/A | Spinel structure | N/A | N/A | 8.7e−6 | No | <1 |

DISCUSSION

A comparison of Examples 1 to 7 with Comparative Examples 1 and 2 shows that the solid electrolyte materials including the $Li_{3-3\delta}Y_{1+\delta}Cl_6$ crystal phase with a Li:Y mole ratio of less than 3 have a high ionic conductivity of $5\times10^{-5}$ S/cm or more near room temperature. It also shows that no phase transition occurs at a temperature in the range of $-30°$C. to $80°$ C. Thus, Examples 1 to 7 have a stable structure in the expected operating temperature range of the battery.

In particular, Examples 1 and 2 show that the solid electrolyte material including as a single phase the first crystal phase with a Li:Y mole ratio of less than 3 has a stable structure in the expected operating temperature range of the battery and has high ionic conductivity.

Examples 3 to 5 show that a Li:Y mole ratio of 3 (Example 3) or more than 3 (Examples 4 and 5) in the solid electrolyte material results in the deposition of the LiCl phase and that the solid electrolyte material including the first crystal phase with a Li:Y mole ratio of less than 3 has a stable structure in the expected operating temperature range of the battery and has high ionic conductivity.

Examples 6 and 7 show that the solid electrolyte material with a Li:Y mole ratio of less than 3 has a stable structure in the expected operating temperature range of the battery and has high ionic conductivity even in the presence of a phase other than the first crystal phase.

In Examples 1 to 7, the battery performed the charge-discharge operation at room temperature. By contrast, Comparative Example 2 had little discharge capacity and could not perform the battery operation. Furthermore, the materials according to Examples 1 to 7 contained no sulfur as a constituent element and generated no hydrogen sulfide.

Consequently, the solid electrolyte material according to the present disclosure generates no hydrogen sulfide and can stably maintain high lithium ion conductivity.

What is claimed is:

1. A solid electrolyte material comprising:
   a first crystal phase,
   wherein the first crystal phase has a composition that is deficient in Li as compared with a composition represented by the following composition formula (1):

$Li_3Y_1Cl_6$, wherein the first crystal phase is represented by the following composition formula (2):

$Li_{3-3\delta}Y_{1+\delta}Cl_6$, where $0 < \delta \leq 0.15$.

2. The solid electrolyte material according to claim 1, wherein $0.01 \leq \delta \leq 0.133$.

3. The solid electrolyte material according to claim 1, wherein
   the solid electrolyte material has an X-ray diffraction pattern that includes a peak in each of a first range, a second range, and a third range, the X-ray diffraction pattern being measured using Cu-Kα radiation as an X-ray source,
   in the first range, a diffraction angle 2θ is 30.34 degrees or more and 32.36 degrees or less,
   in the second range, the diffraction angle 2θ is 39.51 degrees or more and 42.07 degrees or less, and,
   in the third range, the diffraction angle 2θ is 47.18 degrees or more and 50.30 degrees or less.

4. The solid electrolyte material according to claim 3, wherein
   the X-ray diffraction pattern further includes a peak in a fourth range in which the diffraction angle 2θ is 15.2 degrees or more and 16.23 degrees or less and in a fifth range in which the diffraction angle 2θ is 52.4 degrees or more and 54.6 degrees or less.

5. The solid electrolyte material according to claim 3, wherein
   the X-ray diffraction pattern satisfies $FWHM/2\theta_p \leq 0.01$, where FWHM denotes a full width at half maximum of the peak in the first range, and $2\theta_p$ denotes a central value of the peak.

6. The solid electrolyte material according to claim 1, wherein
   the first crystal phase contains a chlorine sublattice, and
   the chlorine sublattice has an arrangement of chlorine that includes an atomic arrangement of a distorted hexagonal close-packed structure.

7. The solid electrolyte material according to claim 1, wherein
   the first crystal phase contains an atomic arrangement of a $Li_3YbCl_6$ structure.

8. The solid electrolyte material according to claim 1, wherein
   the solid electrolyte material has an X-ray diffraction pattern that includes a peak in at least one range selected from the group consisting of a range in which a diffraction angle 2θ is 29.18 degrees or more and 31.03 degrees or less and a range in which the diffraction angle 2θ is 33.83 degrees or more and 36.00 degrees or less, the X-ray diffraction pattern being measured using Cu-Kα radiation as an X-ray source.

9. The solid electrolyte material according to claim 8, further comprising
   a second crystal phase,
   wherein the second crystal phase has a LiCl parent structure.

10. The solid electrolyte material according to claim 1, wherein
    the solid electrolyte material has an X-ray diffraction pattern that includes a peak in at least one range selected from the group consisting of a range in which a diffraction angle 2θ is 14.34 degrees or more and 15.23 degrees or less and a range in which the diffraction angle 2θ is 25.65 degrees or more and 27.26 degrees or less, the X-ray diffraction pattern being measured using Cu-Kα radiation as an X-ray source.

11. The solid electrolyte material according to claim 10, further comprising
    a third crystal phase,
    wherein the third crystal phase has a $YCl_3$ parent structure.

12. A battery comprising:
    the solid electrolyte material according to claim 1;
    a positive electrode;
    a negative electrode; and
    an electrolyte layer between the positive electrode and the negative electrode,
    wherein at least one selected from the group consisting of the positive electrode, the negative electrode, and the electrolyte layer contains the solid electrolyte material.

* * * * *